United States Patent [19]
Tibbitts

[11] Patent Number: 5,666,864
[45] Date of Patent: Sep. 16, 1997

[54] EARTH BORING DRILL BIT WITH SHELL SUPPORTING AN EXTERNAL DRILLING SURFACE

[76] Inventor: Gordon A. Tibbitts, 1378 Lakewood Cir., Salt Lake City, Utah 84117

[21] Appl. No.: 414,624

[22] Filed: Mar. 31, 1995

Related U.S. Application Data

[62] Division of Ser. No. 173,679, Dec. 22, 1993, Pat. No. 5,441,121.

[51] Int. Cl.$^6$ .................. B21K 5/02; E21B 10/52
[52] U.S. Cl. ........................ 76/108.2; 175/417
[58] Field of Search ............ 76/108.1, 108.2, 76/108.4; 175/374, 414, 415, 417; 29/447

[56] References Cited

U.S. PATENT DOCUMENTS

| | | | |
|---|---|---|---|
| 1,922,559 | 8/1933 | Strobel | 175/417 |
| 2,039,494 | 5/1936 | Sanderson | 175/414 X |
| 4,083,415 | 4/1978 | Kita e al. | 175/415 X |
| 4,398,952 | 8/1983 | Drake | 76/108.2 |
| 4,454,922 | 6/1984 | Jamison et al. | 403/359 X |
| 4,883,132 | 11/1989 | Tibbitts | 175/65 |
| 4,919,221 | 4/1990 | Pascale | 175/415 |
| 5,000,273 | 3/1991 | Horton et al. | 76/108.2 |
| 5,101,692 | 4/1992 | Simpson | 76/108.2 |
| 5,150,636 | 9/1992 | Hill | 76/108.2 |
| 5,309,621 | 5/1994 | O'Donnell et al. | 29/447 |
| 5,322,139 | 6/1994 | Rose et al. | 175/415 X |

FOREIGN PATENT DOCUMENTS

| | | |
|---|---|---|
| 1539540 | 1/1979 | Germany. |
| 2121088 | 12/1983 | United Kingdom. |

OTHER PUBLICATIONS

Martin, A.R., Examiner's Report to the Controller re: GB 9424664.2 26 Jul., 1995.
Abstract and Drawing of U.S. Patent Application Serial No. 623,637 for Drill Bit by Goolsbee, Published Dec. 13, 1949.

*Primary Examiner*—Douglas D. Watts
*Attorney, Agent, or Firm*—Marger, Johnson, McCollom & Stolowitz, PC

[57] ABSTRACT

A method for making an earth boring drill bit which includes an outer shell having an external surface adapted to carry cutting elements and a unitary shank and bit core which is fitted into the outer shell. The shell and bit core are threadably engaged with one another or are interferingly engaged. The shell and bit core may be welded, secured with brazing alloys or with high temperature adhesives. In one embodiment, a ridge formed on the shank is received in a groove formed on an interior surface of the shell to prevent relative rotational movement of the shank and shell during drilling. In another embodiment, the shell is formed using matrix infiltration techniques. After the shell is formed, it is heated to braze cutters thereto. While still hot from the brazing process, the shell and shank are fitted together. After cooling the shell contracts to form heat shrink connection between the shell and the shank.

55 Claims, 9 Drawing Sheets

EARTH BORING DRILL BIT WITH SHELL SUPPORTING AN EXTERNAL DRILLING SURFACE

This is a division of application Ser. No. 08/173,679, now U.S. Pat. No. 5,441,121 filed Dec. 22, 1993.

BACKGROUND OF THE INVENTION

1. Field of the Invention

The present invention relates generally to earth boring drill bits and more particularly to such bits which are assembled from two or more separately manufactured portions, one of which includes an external surface adapted to carry cutting elements and the other portion including a shank having a set of threads on one end thereof for connecting the drill bit to a string of drill pipe.

2. Description Of the Related Art

Earth boring drill bits typically include a bit body upon which cutting elements are carried and a separate shank which is mounted on the bit body during the manufacturing process. The cutting elements may include natural or synthetic diamond cutters which are disposed on the bottom and sides of the bit body. The shank is coaxial with the bit body and includes a set of threads on an upper end thereof for connecting the drill bit to the drill string. One example of such drill bit is illustrated in U.S. Pat. No. 4,499,795 to Radtke for a method of drill bit manufacture.

In another known type of drill bit, an infiltratable powder, e.g., tungsten carbide, is formed in a mold around a steel inner core, referred to as blank to which a threaded shank is typically welded after infiltration, it is necessary to position forms in the mold which produce matrix coated ducts in the bit interior to provide flow paths for the drilling fluid to emerge on the face of the bit. After the core and powder are placed in the mold, it is placed in a resistance furnace, or alternatively an induction heater may be positioned adjacent the exterior of the mold, to heat and thereby infiltrate the powder. This is a time consuming process because the material in the mold presents a considerable mass and because the heat must be conducted from the exterior of the mold to the interior thereof. Cutters may be either integrated into the infiltrated matrix or brazed onto the matrix body after the matrix is infiltrated and the bit is removed from the mold. Complex ports which connect with nozzles on the face of the bit must be designed, built and placed into the mold prior to infiltration.

Prior art matrix bits use substantially solid cylindrical blanks which are heavy and which prevent use of matrix techniques for open bits such as that shown in U.S. Pat. No. 4,883,132 to Tibbitts.

In another prior art bit, U.S. Pat. No. 5,101,692 to Simpson discloses a drill bit manufacturing process in which separate portions are assembled to form a drill bit. One of the portions comprises an integrated bit shank and bit head core, referred to collectively as a bit shank. The other portion comprises a bit head in which the bit core is received. In Simpson, the bit head is investment cast from a steel alloy which is highly resistive to abrasive wear and fluid erosion such as a high content cobalt alloy like stellite. The bit shank is made from an easily machined steel and includes threads on both ends thereof, an upper set for connecting to a drill string and a lower set for threadably engaging corresponding threads formed in the bit head. After the head is cast and the shank machined, the same are threaded together and locked to one another by fusion bonding or by a mechanical lock.

According to the Simpson patent, the advantages of the manufacturing process described and claimed therein include providing a bit head and shank with different properties. The bit head is abrasive to wear and resistant to fluid erosion while the shank is easily machinable and has the capability of withstanding high stress or fatigue levels. Investment casting also provide very accurate surfaces for positioning cutter pockets on the bit head.

U.S. Pat. No. 5,150,636 to Hill discloses a rock drill bit and method of making same in which a head having a working face at one end and a recess at the other end having a cross-section corresponding in shape to the tip of a shank except that the recess is slightly smaller than the shank. In assembling the bit, the shank is cooled in a cryogenic gas to reduce its size and thereafter inserted into the head recess. When the components return to ambient temperature, a shrink fit is established between the head and the shank. As in Simpson, the shank and head are made of different materials with the head being made of material which is both tough and hard, such as hardened steels. Such material cannot be easily heated without damaging the head. If it is heated, it must be cooled very slowly to prevent the steel from becoming brittle.

It would be desirable to provide improved techniques for connecting a drill bit shell having an external surface for mounting cutting elements thereon to a complimentary bit core and shank. It would also be desirable to provide for utilizing matrix techniques for manufacturing a bit shell which is connectable to a complimentary integrated bit core and shank and which obviated the need for matrix coated internal ducts for porting drilling fluid bit crown would also be desirable. It would be advantageous to reduce manufacturing time to the face of the bit. Improved hydraulic supply and reduced erosion on the interior of the for drill bits and to eliminate the need for a conventional blank when manufacturing a matrix bit. An engineered, lightweight, blank which supports a matrix or other bit head and which is more open than prior art blanks would also be advantageous. It would be beneficial to provide for interchangeability of different external shells with a single bit core and shank and to provide a single design for a bit core and shank which is suitable for connection to a range of bit head shells having different external shapes or sizes.

SUMMARY OF THE INVENTION

In one aspect, the present invention comprises a method for making an earth boring drill bit in which an outer shell is formed. The shell has an external surface adapted to carry cutting elements and an internal surface adapted for connection to a bit shank. After the shell is removed frown the mold and while it is still hot, the bit shank is engaged with an internal surface of the shell. As the shell cools, it contracts into tight engagement with the shank. Alternatively, the shell may also be rapidly reheated after removal from the mold due to the relatively low shell mass for eventual mounting to the shank or mounting cutters on the external surface.

In another aspect, the shell includes a bore for receiving the bit shank which is then welded to the shell about the periphery thereof. In still another aspect, an interlocking groove and ridge is disposed between an internal surface of the shell and the bit shank. The groove and ridge are oriented to resist relative rotational motion of the shell and shank during drilling.

In still another aspect, a drill bit and method of manufacturing is provided in which an outer shell is attached to a shank by various means. Preferred methods of manufacturing the shell of the present invention include infiltration and machining. Another possible but not preferred method could be investment casting.

The foregoing and other objects, features and advantages of the invention will become more readily apparent from the following detailed description of a preferred embodiment which proceeds with reference to the drawings.

DETAILED DESCRIPTION OF THE PREFERRED EMBODIMENT

Figure 1:
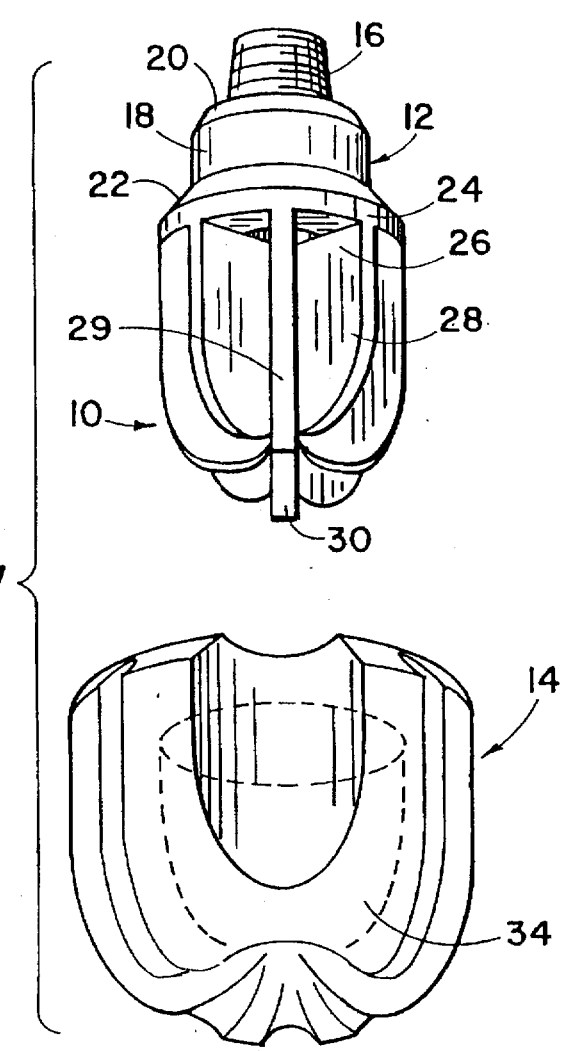
FIG. 1 is an exploded perspective view of a drill bit constructed in accordance with the present invention.

Turning now to FIG. 1, indicated generally at 10 is a drill bit constructed in accordance with the present invention. Included therein is an integrated bit core and shank, referred to herein collectively as a shank 12, and an outer shell 14.

Shank 12 includes a threaded upper portion 16 for connecting drill bit 10 to a drill string (not shown). A bevel 20 separates upper portion 16 from a cylindrical portion 18. Similarly, a bevel 22 separates cylindrical portion 18 from a cylindrical disk 24. It should be appreciated that threaded portion 16, bevel 20, cylindrical portion 18, bevel 22 and cylindrical disk 24 are, in the present embodiment of the invention, integrally formed from a single piece of steel. Other techniques for forming shank 12, such as casting, are also within the scope of the present invention.

A cylindrical bore 26 communicates with a lower surface of cylindrical disk 24, as is viewable in FIG. 1, and extends axially therefrom through the bit with an opening at the upper end of threaded upper portion 16. Thus, fluid pumped down the drill string flows downwardly out of bore 26 as will later be more fully described in connection with a description of the operation of the drill bit.

A plurality of ridges or blades, like blades 28, 29, 30 extend downwardly from the underside of disk 24 and radially outwardly from a central longitudinal axis of the drill bit.

Shell 14 includes an external surface 34 which may have pockets (not shown) formed therein suitable for mounting cutting elements (also not shown) thereon. Shell 14 is manufactured utilizing matrix powder packed into a mold body which is thereafter infiltrated in a manner which is hereinafter described. The shell can also be manufactured by infiltrating around a ductile form, as described hereinafter with reference to FIG. 6, or by machining. Natural or artificial diamond cutters, or surface set diamonds, may be cast in to the shell during infiltration instead of or in addition to cutting elements mounted after infiltration is complete.

The embodiment of FIG. 1 provides a one-piece mandrel, unlike prior art bits as described in hereinafter in connection with FIGS. 17–20. The combination of a blank, around which a prior art infiltrated bit is formed, and a shank, which is welded to the blank for providing a threaded connection to a drill string, is referred to in the art as a mandrel. A one-piece mandrel reduces manufacturing time and expense while providing a mandrel with increased integrity. Also, the internal cavity defined between the mandrel and shell 14 provides for better fluid distribution than in prior art bits which improves fluid cooling of the bit and reduces fluid erosion on the bit crown interior. Such a mandrel provides structural integrity with less weight than prior art mandrels and in a more open configuration.

Figure 2A:
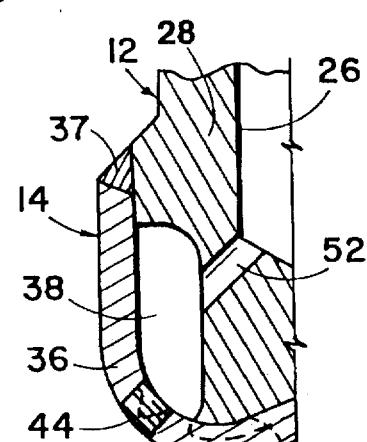
FIG. 2A is a quarter sectional view of another bit having an external plenum formed between the shell and the shank constructed in accordance with the present invention.

Throughout this description, similar structure is identified with a corresponding number in the various embodiments of the invention. In FIG. 2A, shank 12 includes a substantially solid core which is received into shell 14. Shell 14 is defined by a shell wall 36 having a substantially constant thickness. The shell is connected to shank 12 via a weld 37 about the circumference of the shank and shell. Braze alloys, adhesives or other suitable techniques may be used to connect the shank and shell together.

To form shell 14, a mold body is provided having a cavity therein which includes features conforming to those on the external surface of shell 14. Nozzles, like nozzle 44, are placed inside the mold body in selected positions. This eliminates the need for interior porting extending from the nozzle to the axial cylindrical bore which communicates with the drill pipe.

A bore 52 is formed in shank 12 and communicates with bore 26. An external plenum, i.e., one which is formed adjacent the interior surface of the shell, is formed between a radially inner surface 38 of shell 14 and shank 12. At least one bore, like bore 52, communicate between the plenum and bore 26. This permits fluid to circulate within and adjacent the shell.

Shell internal surface 38 may include a plurality of grooves, like grooves 42, into which a corresponding blade formed on shank 12 is received when the shank is inscribed into shell 14. These interlocking ridges and grooves accept torsion when the bit is drilling and relieve stress on weld 37.

Figure 2B:
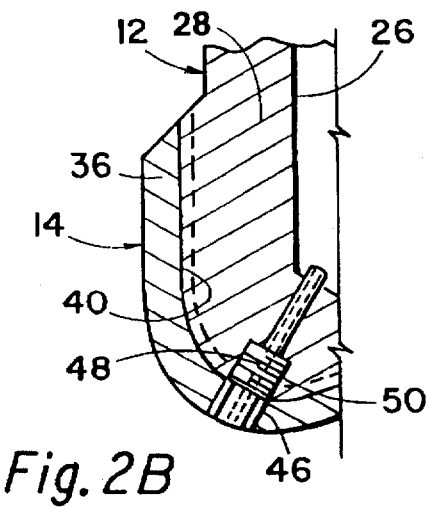
FIG. 2B is a quarter sectional view of another bit having an internal plenum formed in the shank interior constructed in accordance with the present invention.

In FIG. 2B, grooves 40 also receive ridges or blades formed on the shank to accomplish a similar stress relieving function in the bit of FIG. 2B. The bit of FIG. 2B has an internal plenum, i.e., one formed internally of shank 12. In FIG. 2B the internal plenum comprises the lowermost portion of bore 26.

Figure 3:
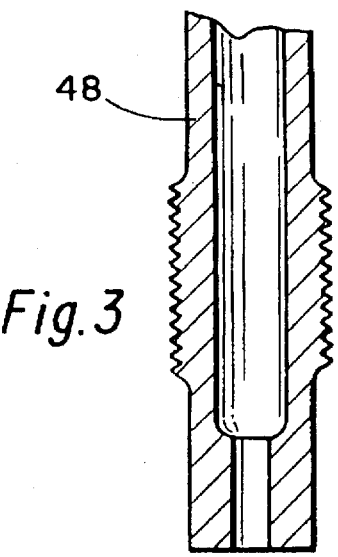
FIG. 3 is an enlarged sectional view of a nozzle shown in FIG. 2B.

During infiltration of the bit of FIG. 2B, forms are placed to provide cylindrical openings, like opening 46, into which a nozzle 48, is inserted after the matrix is infiltrated and cooled to provide fluid communication between bore 26 and the exterior of the bit. Nozzle 48 is illustrated in FIG. 3. In the present embodiment of the invention nozzle 48 is made from tungsten carbide and extends into a central cavity in the bit as shown. The nozzle therefore protects mandrel 12 from wear caused by the high pressures and flow rates of drilling fluid therethrough. A threaded connection 50 is formed between nozzle 48 and a bore formed in blade 28. Nozzle 48 can be changed by unthreading if replacement is required.

In using a drill bit like that shown in FIGS. 1, 2A or 2B, threaded connection 16 is engaged with the lower end of a drill string which is then lowered into a well bore. During drilling, drilling fluid is pumped down the drill string and into bore 26. The fluid passes through the bores, like bore 52, into plenum 38 and subsequently into nozzle 44 (and other nozzles not visible) and thereafter upwardly in the well bore in the annulus between the drill string and the radially inner surface of the well bore. Similarly, fluid flows from bore 26 into nozzle 48 (and other nozzles) and up the annulus.

Figure 4:
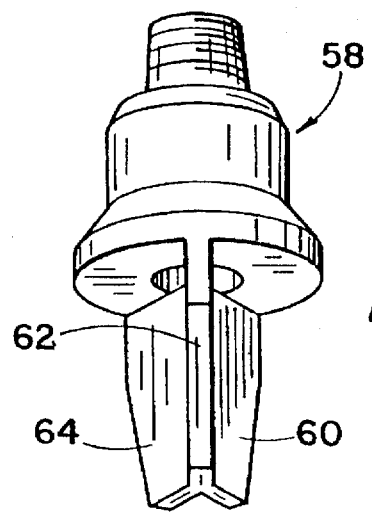
FIG. 4 is a perspective view of an integrated bit core and shank constructed in accordance with the present invention.

Turning now to FIG. 4, indicated generally at 58 is a shank and integrated body core constructed in accordance with the present invention. Shank 58 is substantially identical to shank 12 in all respects except for the geometry of the blades, like blade 28–30 in FIG. 1. Shank 58 includes three blades, 60, 62, 64 which might be configured to be received into a shell having an interior shaped to include grooves for receiving the blades. Such a shell has a construction similar to that described above in connection with shell 14. Shank 58 is welded about the circumference thereof in a manner similar to that of shank 12 in FIG. 2A. The shank and integrated bit core of FIG. 4 is easy to machine and is illustrative, along with the other embodiments of the variety of shapes which can be utilized with the present invention.

Figure 5:
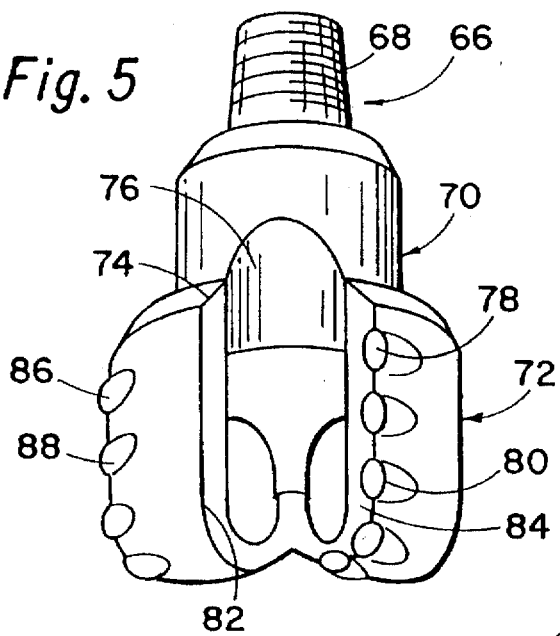
FIG. 5 is a perspective view of another drill bit constructed in accordance with the present invention.
Figure 8:
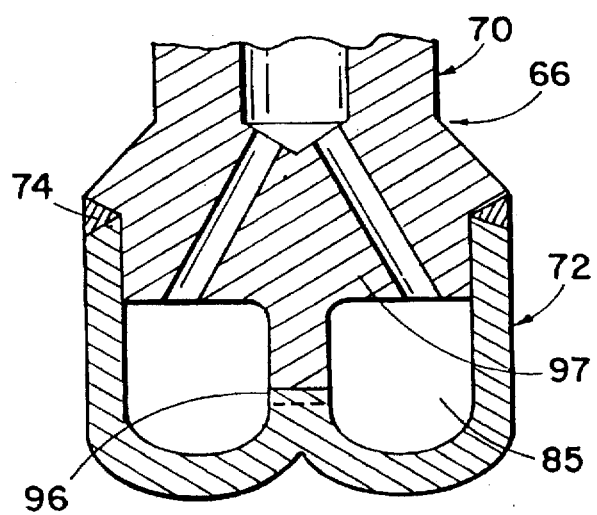
FIG. 8 is a somewhat schematic sectional view of the drill bit of FIG. 5.

Turning now to FIGS. 5 and 8, indicated generally at 66 is another drill bit constructed in accordance with the present invention. Included therein is a threaded upper portion 68 for connecting the drill bit to a drill string. Threaded portion 68 is mounted on an integrated shank and bit core, collectively referred to as a shank 70. Shank 70 is received in a shell 72 which may be infiltrated in similar fashion to shell 14, or through another casting process, or may be machined from steel. Shank 70 is received within shell 72 and welded thereto about the circumference of each via a weld 74 which is viewable in both FIGS. 5 and 8. Shank 70 includes a concave portion or junk slot 76 formed thereon. Shell 72 includes a plurality of cutters, like cutters 78, 80 mounted thereon. The cutters are mounted adjacent an opening in shell 72 defined by opposing edges 82, 84. The opening communicates with an interior cavity. A similar opening (not visible), which also communicates with the cavity, is adjacent a row of cutters including cutters 86, 88. Drill bit 66 is constructed generally in accordance with the design disclosed in U.S. Pat. No. 4,883,132 to Tibbitts, which is incorporated herein by reference, for a drag bit for drilling in plastic formation having maximum chip clearance and hydraulic for direct chip impingement except that the gauge and bottom portions of the drilling surface are formed on shell 72 which in turn is welded to shank 70 as described above. Bit 66 includes a nozzle (not visible) formed on a lower portion of shank 70 within the cavity defined between the shell and shank. The nozzle is aimed at the cutters, like cutters 78, 80 and flushes cuttings therefrom during drilling as described in the '132 patent to Tibbitts.

In FIG. 8, drill bit 66 is shown in a somewhat schematic sectional view. A torque lug 96 extends downwardly from the lower end of a center column 97 which is coaxial with the axis of bit 66. The torque lug extends into a slot formed in shell 72. This arrangement provides torsional stiffening to center column 97 during drilling.

As can be seen, fluid passageways in shank 70 permit drill fluid to circulate down the string and into shell 72 where the fluid is forced from nozzles (not shown in FIG. 8) contained in shank 70 into the cavities, like cavity 85, and to the top of the well in which the bit is drilling. The nozzles, cavities and flow passages for the bit of FIGS. 5 and 8 are illustrated in the above-referenced Tibbitts patent.

Figure 6:
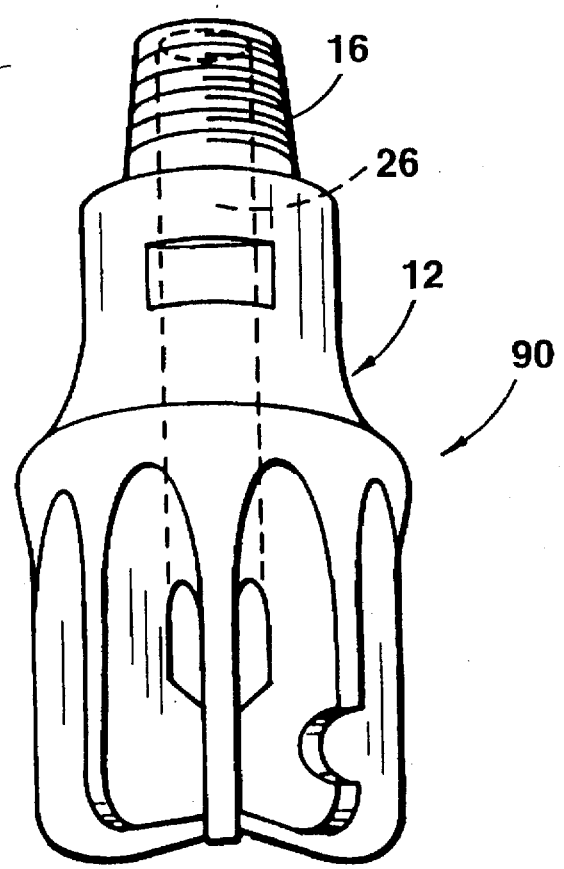
FIG. 6 is an exploded perspective view of still another drill bit constructed in accordance with the present invention.
Figure 6:
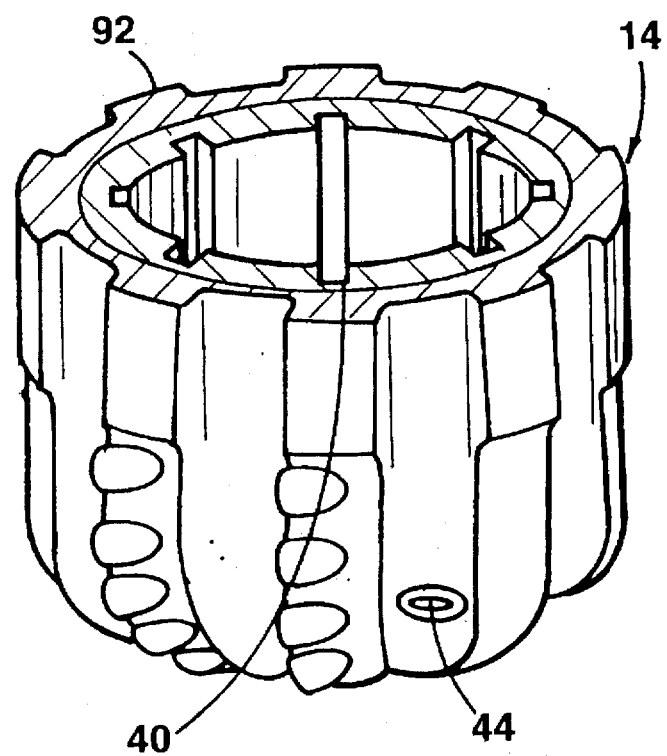

Turning now to FIG. 6, indicated generally at 90 is another drill bit constructed in accordance with the present invention which is similar in construction to the embodiments of FIGS. 1–4. Visible in FIG. 6 is a facing material 92 which is packed into the mold body before the interior mold portion is positioned and the remaining matrix powders packed between the mold body and inner mold portion.

Nozzle 44 does not need interior porting to connect it to the fluid in bore 26. As in FIG. 2A, the nozzle communicates directly with fluid inside shell 14. This eliminates the need for integrating complicated nozzle porting into the matrix when the shell is formed. If one of the shank blades, like blade 29, interferes with fluid distribution to nozzle 44, a corresponding notch 93 in blade 29 immediately above nozzle 44 provides fluid circulation between the flutes formed on the shank between the blades to the nozzle inside the shell.

Figure 7B:
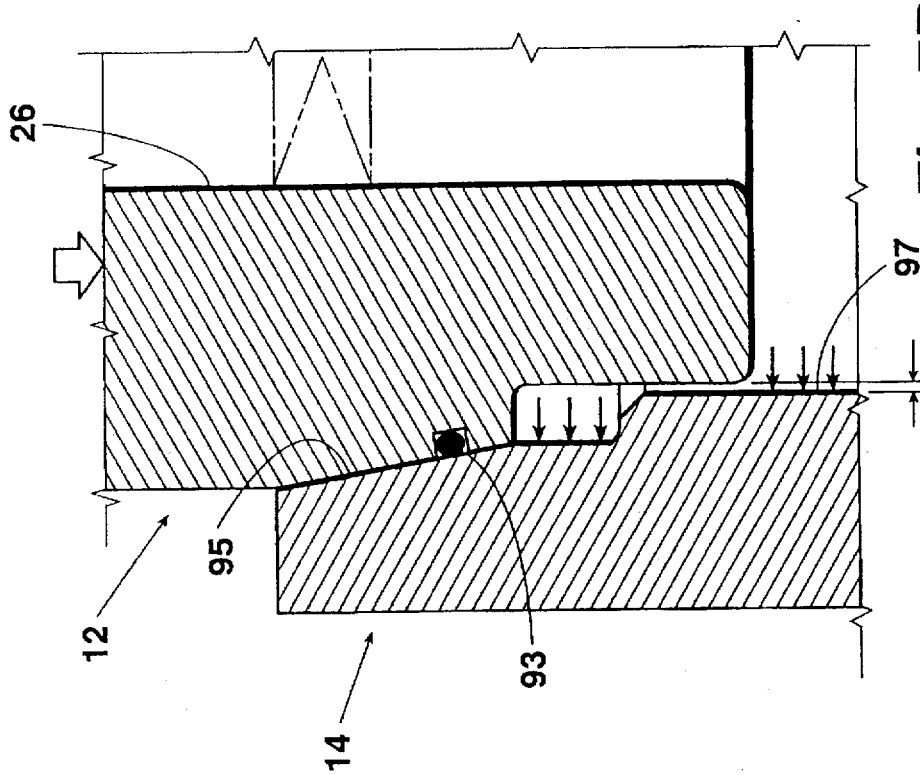
FIG. 7B is a view similar to FIG. 7A after the bit is assembled.
Figure 7A:
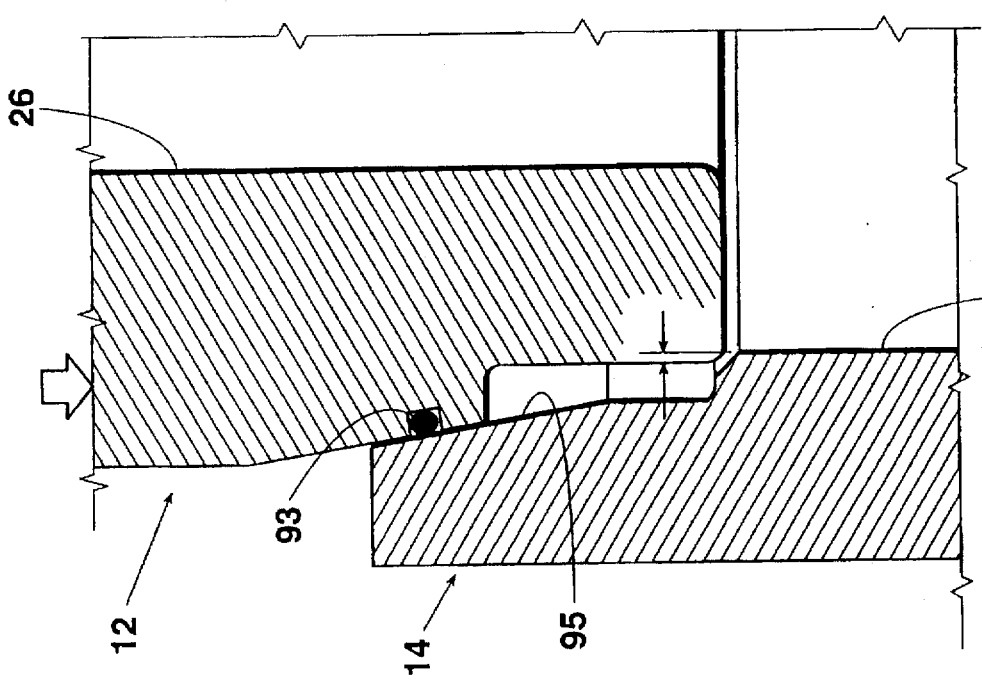
FIG. 7A is an enlarged partial sectional view of a drill bit during assembly in accordance with the present invention.

Hydraulic fitting may be used to connect the shank to the shell in lieu of or in addition to welding. With reference to FIG. 7A, an O-ring 93 is disposed between shank 12 and shell 14 about the circumference thereof. Fluid is pumped into shell 14 via bore 26 thus expanding the shell. The expansion is sufficient to permit the shank to be pressed down a tapered portion 95 of the shell into a cylindrical collar portion 97. Once the pressure is released, the shell and shank are locked together.

Figure 9:
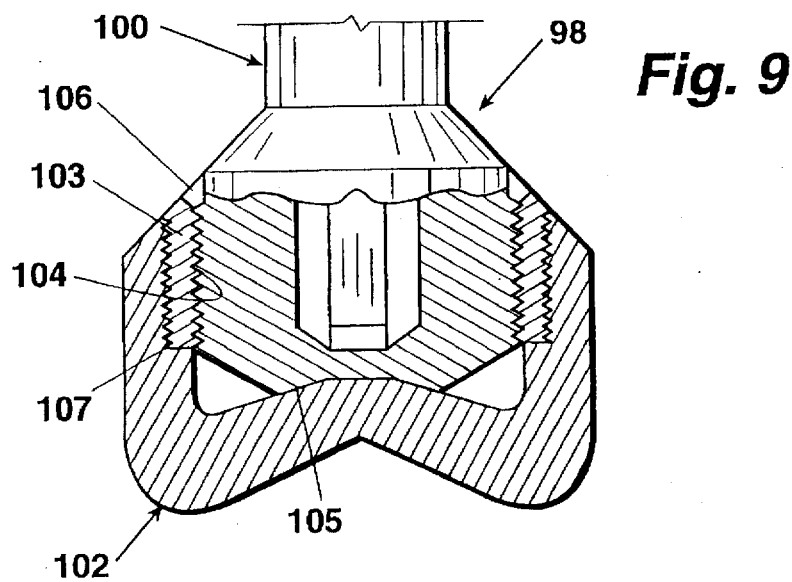
FIG. 9 is a partial sectional view of another drill bit constructed in accordance with the present invention illustrating an attachment method.

Turning now to FIG. 9, indicated generally at 98 is another drill bit constructed in accordance with the present invention. Included therein is a shank and integrated bit body, collectively referred to as a shank 100, and a shell 102. In drill bit 98 there is a threaded connection 104 between a radially inner surface of shell 102 and a radially outer surface of the lower portion of shank 100. Shank 100 includes a downwardly directed shoulder 105 which seats against an internal surface of shell 102 when threads 104 are fully engaged. Thereafter, a weld 106 is formed about the circumference of the shank (or portions thereof) and shell in order to secure the two together.

Figure 10:
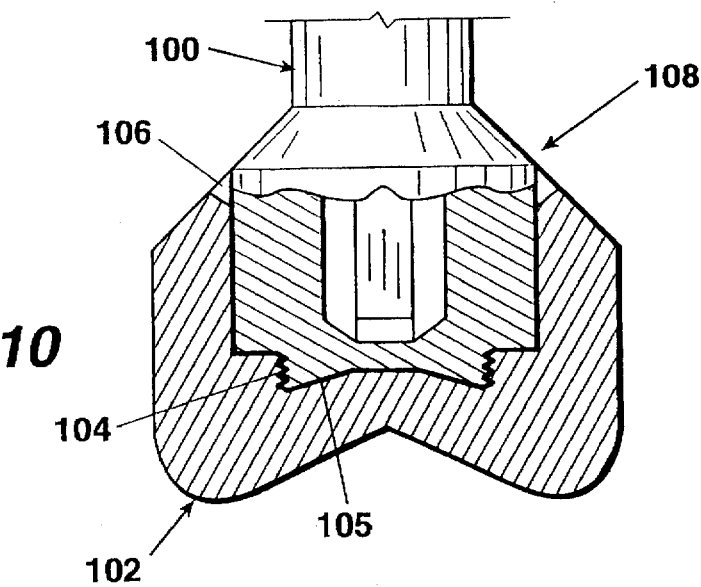
FIG. 10 is partial sectional view similar to FIG. 9 of another drill bit constructed in accordance with the present invention illustrating an attachment method.

Drill bit 108 comprises another embodiment of the present invention in which similar structure corresponding to that illustrated in FIG. 9 is identified with the same numeral in FIG. 10. The invention contemplates use of either a weld or threads or both together as illustrated in FIGS. 9 and 10.

Figure 11:
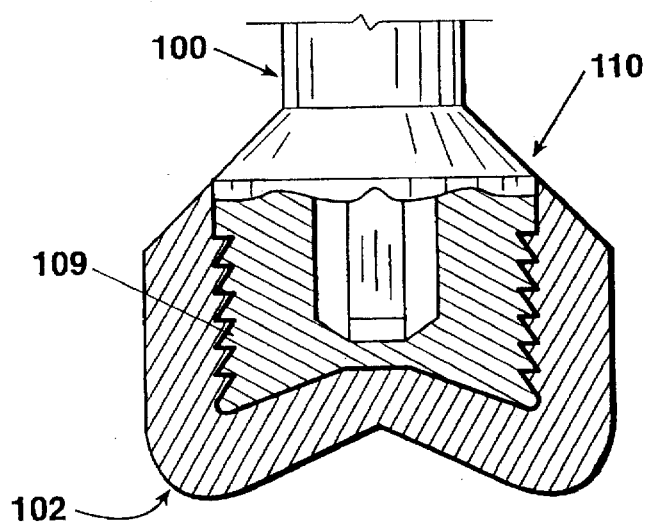
FIG. 11 is a partial sectional view of another drill bit constructed in accordance with the present invention.
Figure 12:
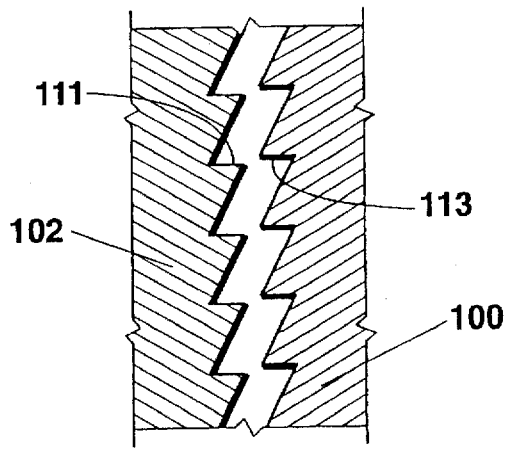
FIG. 12 is an enlarged schematic sectional view of a threaded connection in the drill bit of FIG. 11 before cooling.
Figure 13:
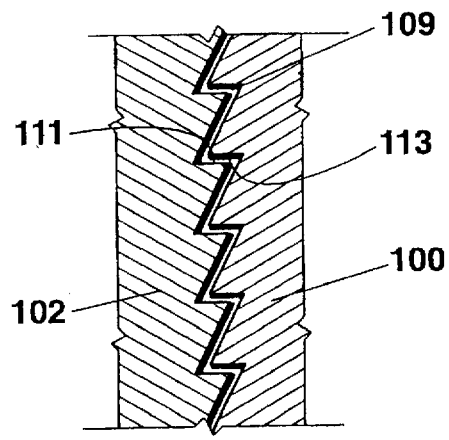
FIG. 13 is a view of the threaded connection similar to FIG. 11 after cooling.
Figure 14:
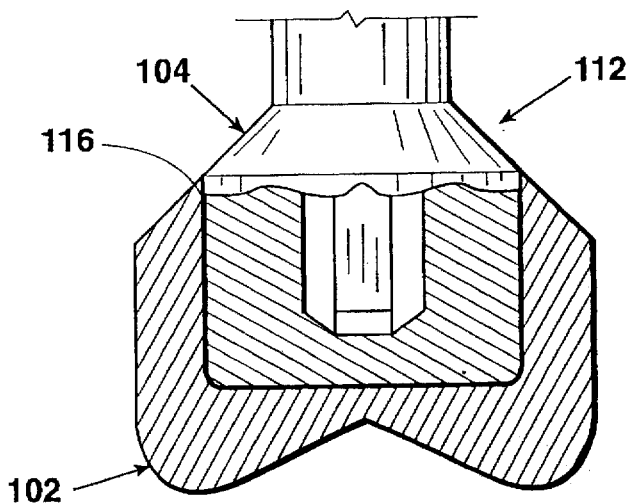
FIG. 14 is a partial sectional view of another drill bit constructed in accordance with the present invention.
Figure 15:
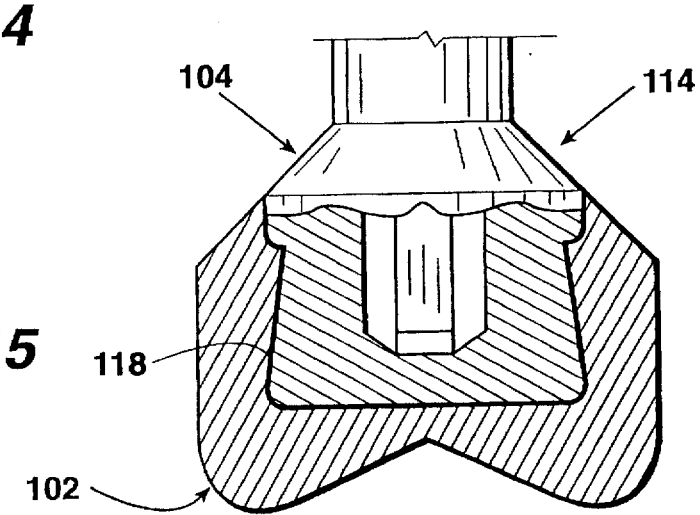
FIG. 15 is a partial sectional view of another drill bit constructed in accordance with the present invention.

Another drill bit 110, illustrated in FIGS. 11–13, is similar to the embodiments of FIGS. 9 and 10. Drill bit 1 10 in FIGS. 11–13, as are the bits in FIGS. 14 and 15, is assembled using heat shrink fitting. In this process, shell 102 is heated and shank 100, which is at room temperature, is engaged with matrix shell 102 as shown in FIG. 11 by a buttress connection 109. As shown in FIGS. 12 and 13, connection 109 includes a plurality of upward facing shoulders, like shoulder 111, on one side thereof and a plurality of downward facing shoulders, like shoulder 113 on the other side of the connection. The shoulders form continuous annular surfaces which are parallel with one another as opposed to a single helical surface as in a screw thread. With the matrix shell 102 hot and shank 100 at room temperature, connection 104 is configured as shown in FIG. 12. As the shell cools, it contracts in size thus drawing the shoulders together as shown in the view of FIG. 13. This has the effect of securely locking the shank to the shell. Alternately, shell 102 may be allowed to cool after it is formed. Prior to connecting the shell to the shank, the shell is heated in a known fashion to braze the cutters thereto. Such heating expands the shell which may then be fitted to the shank and thereafter cooled to accomplish the heat shrink fit. The shoulders illustrated in FIGS. 12 and 13 may be inverted, i.e., the shoulders are oriented to resist tension between the bit and drill string to which it is attached. Alternatively, drill bit 110 may be assembled using the previously described hydraulic fitting technique.

In FIG. 14 drill bit 112, also constructed in accordance with the present invention, includes a generally cylindrical opening 116 formed in shell 102 with shank 104 having a generally cylindrical lower portion. The two are sized so that matrix shell 102 can receive the lower end of shank 104, as shown in FIG. 14, while the matrix shell is heated. When the same cools it contracts thus providing a firm interference fit between the shell and the shank. In drill bit 114 in FIG. 15, a tapered opening 118 is provided in shell 102. The taper corresponds generally to a tapered radially outer portion of the lower end of shank 104. Shank 104 can be received in opening 118 as shown in FIG. 15 while matrix shell 102 is heated. As the shell contracts during cooling a strong connection between shell 102 and shank 104 is formed. The bits of FIGS. 14 and 15 can also be assembled using the hydraulic fitting technique described herein or by using a threaded connection.

Figure 16:
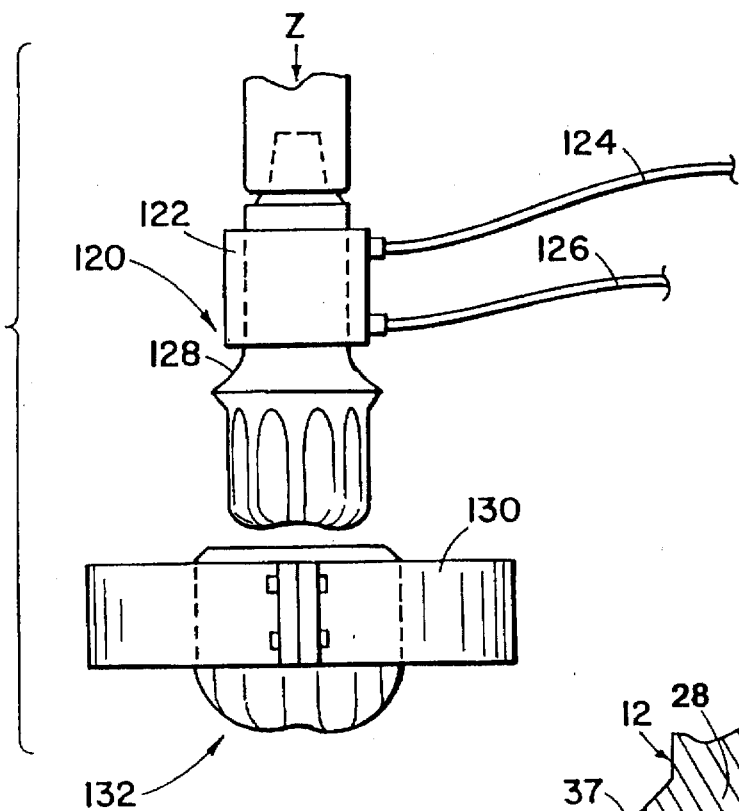
FIG. 16 is an exploded elevational view of a drill bit constructed in accordance with the present invention during the manufacturing process.

Indicated generally at 120 in FIG. 16 is an assembly fixture for assembling a shank and a shell constructed in accordance with the present invention. Included therein is a cooling jacket 122 having an input line 124 and a return line 126 through which coolant flows. The coolant circulates within jacket 122 thereby cooling a shank 128 received therein which is constructed in accordance with the present invention. A concentric clamp 130 positions a hot shell 132, also constructed in accordance with the present invention, coaxially with shank 128. With the shank and shell positioned as shown in FIG. 16, the shank is lowered into the shell. Coolant in jacket 122 maintains the shank relatively cool even in the presence of the heat generated by shell 132. This both prevents the shank from expanding and prevents the drill collar connective thread of the shank from becoming heated above the "knee of transformation" which would cause it to become brittle. After the shank is positioned within the shell, the shell is left to cool and thus contract and engage the shank as described in the embodiments of FIGS. 11–15.

Figure 18:
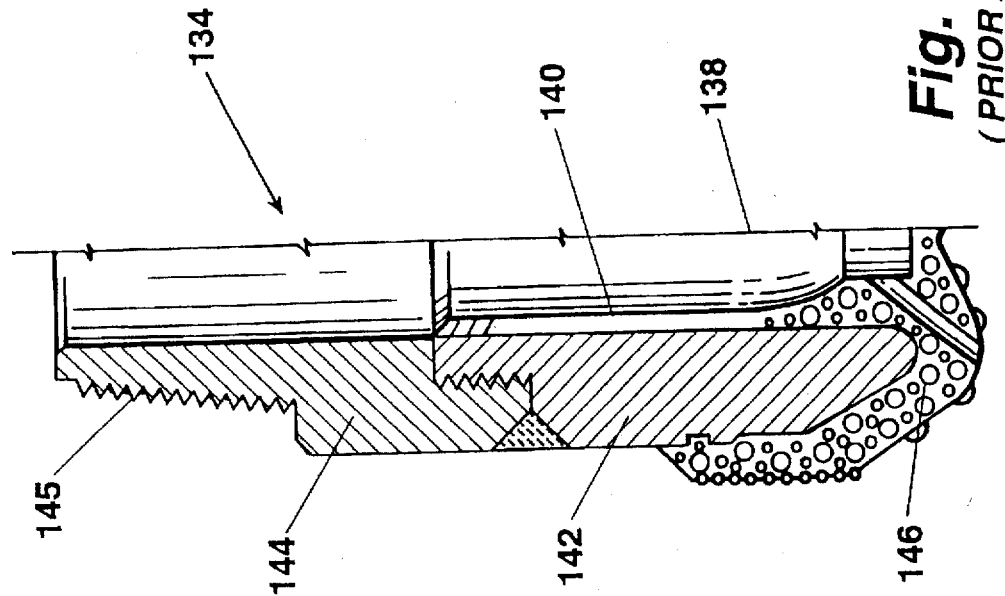
FIG. 18 is a quarter sectional view of the drill bit of FIG. 17.
Figure 17:
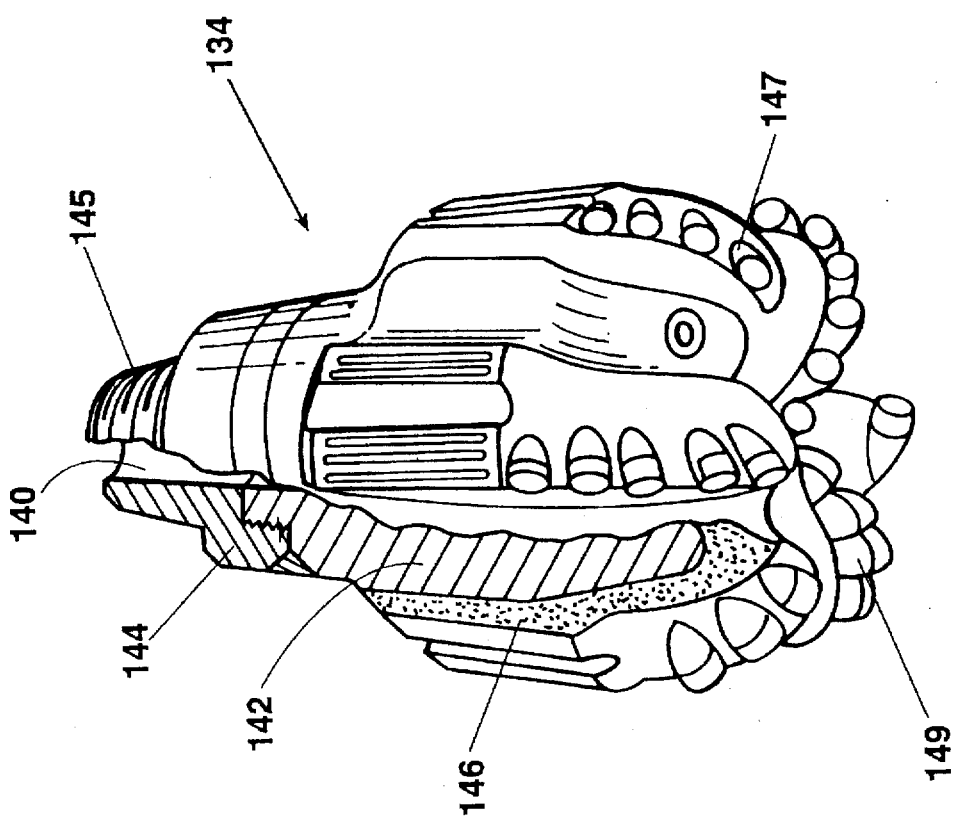
FIG. 17 is a perspective view of a prior art matrix drill bit with a portion of the bit sectioned.

In FIGS. 17 and 18, a typical prior art matrix drill bit, indicated generally at 134, is illustrated to provide a comparison between such a bit and the bit of the present invention. Bit 134 includes a central longitudinal axis 138 and a coaxial bore 140. Bore 140 is also coaxial with a generally cylindrical blank 142 which includes an upper portion or shank 144. The shank includes threads 145 at the upper portion thereof for connecting the drill bit to a string of drill pipe (not shown). Blank 142 is comprised of a relatively ductile steel which has a coating of matrix material 146 bonded thereto. Bore 140 is formed in part through the matrix material.

This type of bit can utilize cutters, like cutters 147, 149, integrally secured to the matrix during the infiltration process or cutters which are mounted on the hardened matrix after infiltration.

Figure 19:
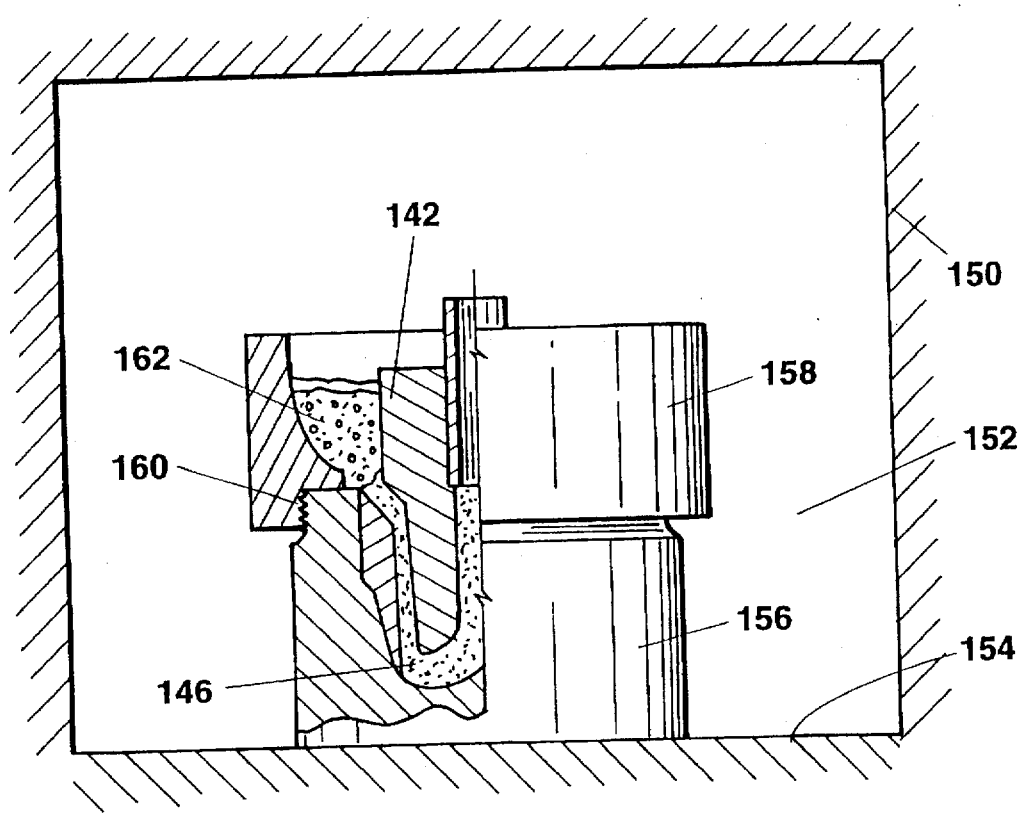
FIG. 19 is a partially sectional view of a drill bit similar to that shown in FIGS. 17 and 18 being manufactured in a furnace.

Turning now to FIG. 19 a conventional furnace 150 includes a chamber 152 having a furnace floor 154. A mold 156 is supported on floor 154. The mold supports a funnel 158 which is engaged with a connection 160 with an upper portion of mold 156. Binder material 162 is received on top of matrix powder 146 which is packed in and around blank 142 as shown. Cutters can be placed in the mold body for integrating the cutters into the bit during the infiltration process. Alternatively, cutters can be brazed to the matrix surface after the bit is removed from the mold.

After the mold and the contents thereof are positioned as shown in FIG. 19, chamber 152 is heated thereby infiltrating matrix powder 146 in a known manner. After the bit is so formed the mold is removed from the furnace and after sufficient cooling the bit is removed from the mold. Thereafter, a steel shank, like shank 144 in FIGS. 17 and 18, having threads formed thereon is welded to blank 142.

Figure 20:
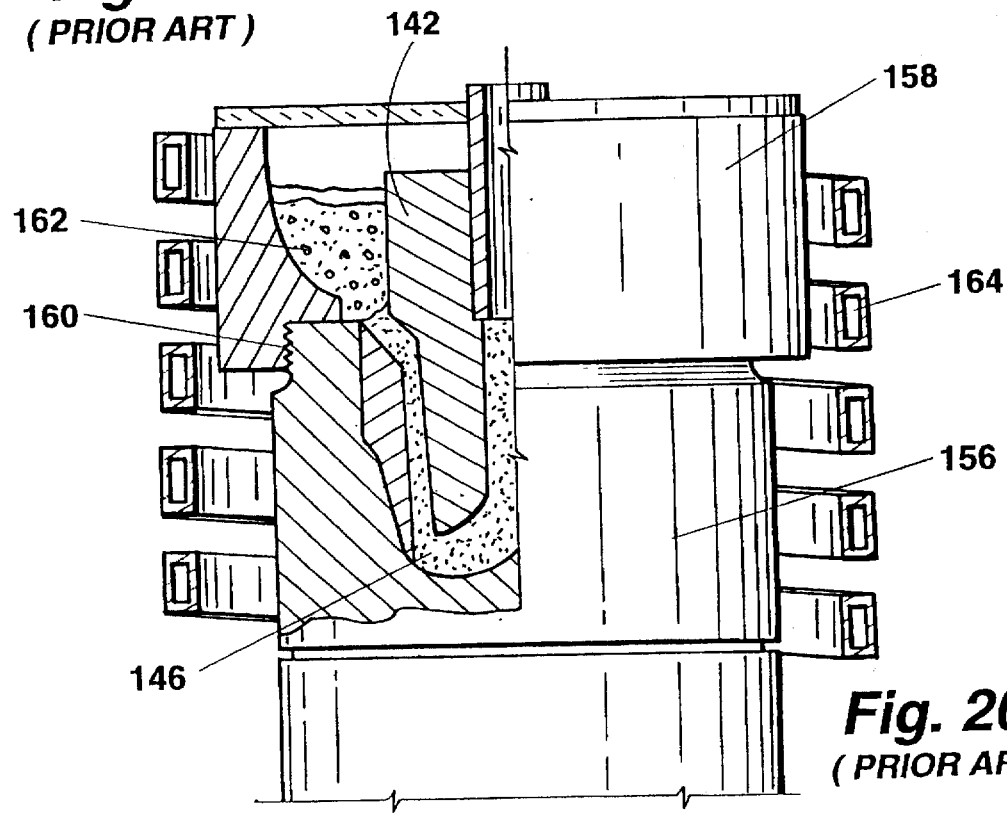
FIG. 20 is a partially sectional view of a drill bit similar to that shown in FIGS. 17 and 18 being manufactured with an induction heater.

Turning now to FIG. 20, an alternative form of infiltrating the matrix powder in mold 156 is illustrated. Included in FIG. 20 is an induction coil heater 164 which heats the mold and the contents thereof thereby infiltrating matrix powder 146. The drill bit of FIGS. 17 and 18 can be manufactured using either of the techniques illustrated in FIGS. 19 and 20.

Figure 21:
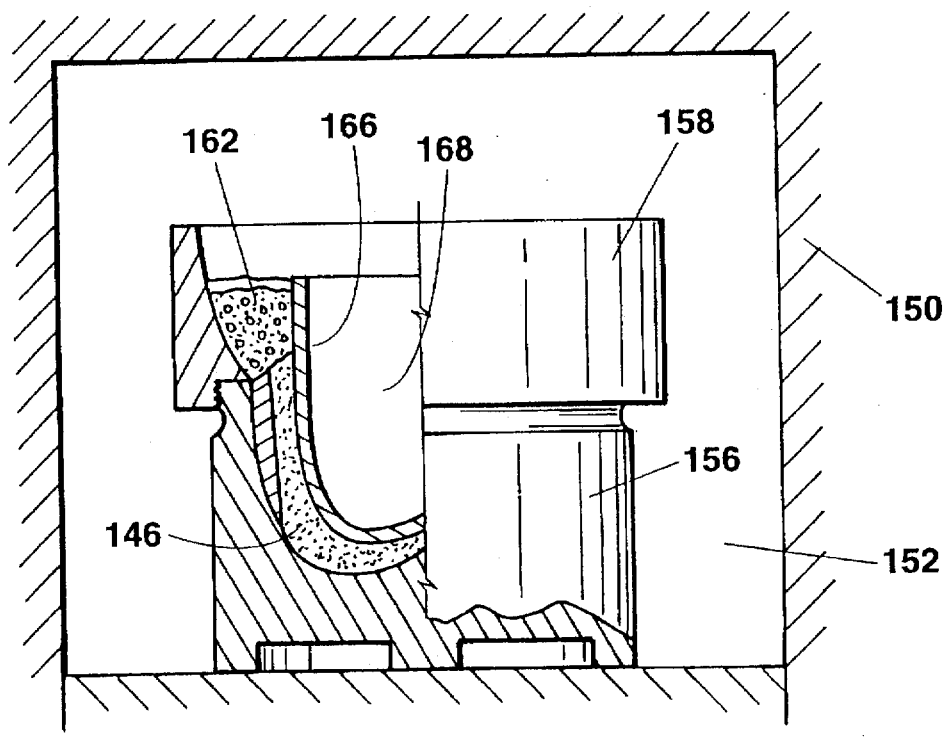
FIG. 21 is a partially sectional view of a drill bit constructed in accordance with the present invention being manufactured in a furnace.

Turning now to FIG. 21 illustrated therein is a mold constructed in accordance with the present invention. As can be seen, matrix powder 146 is formed into a shell shaped by virtue of a mold shell 166, such being also referred to herein as an upper mold body. The mold shell includes a hollow cavity 168. The surface of mold shell 166 which is adjacent matrix powder 146 defines the inner surface of the outer shell of the bit. The features of this mold shell surface define grooves, like grooves 40, 42 in FIGS. 2A and 2B, in which the blades of shank 12 are received.

In an alternative embodiment of the invention, instead of mold shell 166, a similarly shaped steel shell is positioned in the same position as mold shell 166 and forms a finished part of the shell as described in connection with the embodiment of FIG. 6. The steel portion can be ductile relative to the infiltrated material which forms the exterior portion of the shell. In such case, the grooves, like grooves 40,42, are formed on the inner surface of the ductile steel shell.

Figure 22:
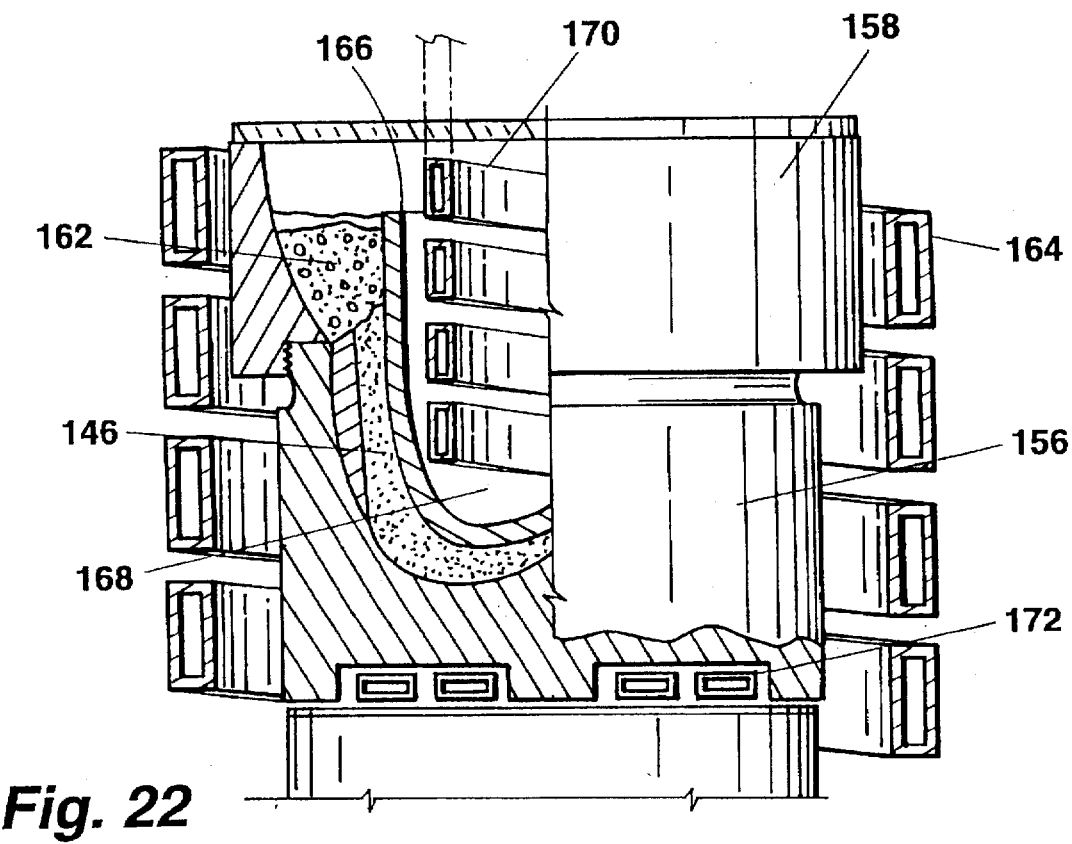
FIG. 22 is a partially sectional view of a drill bit constructed in accordance with the present invention being manufactured with an induction heater.

Illustrated in FIG. 22 is an alternate method of manufacturing a drill bit in accordance with the present invention. Included therein are induction coil heaters 168, 170, 172. Heater 170 can be received within cavity 168 as shown and heater 172 within spaces on the underside of mold 156. With all heaters operating, the matrix powder is uniformly heated which is desirable in forming the infiltrated matrix shell. Induction heating in accordance with the prior art method illustrated in FIG. 20 must be done very slowly because stresses arise between the heated portions and the unheated portions. The system of FIG. 22 permits much more rapid infiltration of the matrix powder without the stresses which would result in the configuration of FIG. 20. Reduced mass coupled with increased surface area and internal heat exposure provides for greatly reduced heating time and more uniform products.

After the matrix powder is infiltrated responsive to heat provided by, e.g., a box heater, a furnace as in FIG. 21 or induction coils as in FIG. 22, the mold is cooled and the bit removed therefrom in the case where the cutters are not integrated into the matrix body during infiltration, they may be brazed to the shell. Brazing requires heating which can be done via a pair of induction coils similar to the configuration of coils 168, 170, illustrated in FIG. 22 except that the mold is removed. When the shell is sufficiently heated, the cutters are brazed thereto in a known manner. When assembling bits of the type illustrated in FIGS. 11–15, in which the shank is inserted into the shell while the shell is hot, the insertion step can be accomplished immediately after brazing the cutters while the shell is still hot from the induction heating necessary for brazing. Thus, the shell can be rapidly heated as a result both of the substantially smaller mass of the matrix material relative to prior art bits and due to use of a second internal induction coil, like coil 170 in FIG. 22. A separate step for heating the shell in order to expand the same to fit it to the shank as described in connection with the bits of FIGS. 11–15 is not require. The assembly fixture illustrated in FIG. 16 and described above can be used for a matrix shell which is heated with induction heaters to expand the shell for assembly.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

I claim:

1. A method for making an earth boring drill bit comprising the:

forming an outer shell of said bit, said shell having an external surface adapted to carry cutting elements and an internal surface adapted for connection to a bit shank;

heating the outer shell in conjunction with mounting cutting elements on said external surface;

engaging the bit shank with the internal surface of said outer shell; and cooling the shell thereby causing the same to contract into further engagement with said shank.

2. The method of claim 1 wherein said internal shell surface and said shank are threaded and wherein engaging the bit shank with the internal surface of said outer shell comprises threadably engaging said internal shell surface with said shank.

3. The method of claim 1 wherein said internal shell surface includes a first annular shoulder and said shank includes a second annular shoulder opposite said first annular shoulder when the shell is contracted into further engagement with said shank.

4. The method of claim 3 wherein engaging the bit shank with the internal surface of said outer shell comprises inserting said shank into said shell until said shoulders are substantially opposite one another.

5. The method of claim 1 wherein forming an outer shell of said bit comprises forming said outer shell in a mold.

6. The method of claim 5 wherein forming said outer shell in a mold comprises the step of infiltrating a matrix powder in a mold.

7. The method of claim 6 wherein said method further comprises: inserting an upper mold body into the mold; and packing the space between said mold and said upper mold body with matrix powder.

8. The method of claim 1 wherein heating the outer shell is performed with an induction heater.

9. The method of claim 9 wherein heating the outer shell comprises:

placing a first induction heater within said shell;

placing a second induction heater adjacent the interior of said shell; and turning on said induction heaters.

10. The method of claim 9 wherein said method further comprises brazing cutting elements on said external surface after said shell is heated.

11. The method of claim 1 wherein said method further includes forming said outer shell around a ductile interior shell.

12. The method of claim 11 wherein said ductile interior shell defines the internal surface of said outer shell and wherein the step of engaging the bit shank with the internal surface of said outer shell comprises the step of engaging the bit shank with an internal surface of said ductile interior shell.

13. The method of claim 1 wherein said internal shell surface includes a bore sized to receive a portion of said shank and wherein the step of engaging the bit shank with the internal surface of said outer shell comprises inserting said shank into said bore.

14. The method of claim 13 wherein said bore and said shank portion are substantially cylindrical.

15. The method of claim 13 wherein said bore and said shank are slightly tapered.

16. The method of claim 1 wherein said method further includes forming a plurality of shells having differently shaped external surfaces and having substantially identically shaped internal surfaces.

17. The method of claim 1 wherein said method further includes forming a plurality of shells having differently sized external surfaces and having substantially identically shaped internal surfaces.

18. A method for making an earth boring drill bit comprising:

introducing matrix powder in a mold to form an outer shell of said bit, said shell having an external surface adapted to carry cutting elements and an internal surface defined by the matrix powder adapted for connection to a bit mandrel;

infiltrating the matrix powder;

urging the bit mandrel against said internal surface after infiltrating the matrix powder;

connecting the mandrel to said shell about the periphery of each.

19. The method of claim 18 wherein said method further includes forming a plurality of radially extending ridges and grooves disposed between said mandrel and the radially inner surface of said bore, said ridges being received in said grooves when said mandrel is inserted in said bore.

20. The method of claim 19 wherein introducing matrix powder in a mold further comprises:
inserting an upper mold body into the mold; and
packing the space between said mold and said upper mold body with matrix powder.

21. The method of claim 18 wherein said method further includes casting a plurality of shells having differently shaped external surfaces and having substantially indentically shaped internal surfaces.

22. The method of claim 18 wherein said method further includes casting a plurality of shells having differently sized external surfaces and having substantially identically shaped internal surfaces.

23. The method of claim 1 wherein mounting cutting elements on said external surface comprises brazing cutting elements on said external surface.

24. A method for making an earth boring drill bit comprising:
forming an outer shell of said bit, said shell having an external surface adapted to carry cutting elements and an internal surface adapted for connection to a bit shank, including:
inserting an upper mold body into a mold;
substantially filling the space between said mold and said upper mold body with matrix powder; and
infiltrating the matrix powder;
heating the outer shell;
engaging the bit shank with the internal surface of said outer shell; and
cooling the shell thereby causing the same to contract into further engagement with said shank.

25. The method of claim 24 wherein heating the outer shell is performed in conjunction with mounting cutting elements on said external surface.

26. The method of claim 24 wherein heating the outer shell is performed with at least one induction heater.

27. The method of claim 26 wherein heating the outer shell comprises:
placing a first induction heater within said shell;
placing a second induction heater adjacent the interior of said shell; and
turning on said induction heaters.

28. The method of claim 27 wherein said method further comprises brazing cutting elements on said external surface after said shell is heated.

29. A method for making an earth boring drill bit comprising:
forming an outer shell of said bit, said shell having an external surface adapted to carry cutting elements and an internal surface adapted for connection to a bit shank;
heating the outer shell, including:
placing a first induction heater within said shell;
placing a second induction heater adjacent the interior of said shell; and
turning on said induction heaters;
engaging the bit shank with the internal surface of said outer shell; and
cooling the shell thereby causing the same to contract into further engagement with said shank.

30. The method of claim 29 wherein forming an outer shell of said bit comprises forming said outer shell in a mold.

31. The method of claim 29 wherein forming said outer shell in a mold comprises infiltrating a matrix powder in a mold.

32. The method of claim 31 wherein said method further comprises:
inserting an upper mold body into the mold; and
substantially filling the space between said mold and said upper mold body with matrix powder.

33. The method of claim 29 wherein heating the outer shell is performed in conjunction with mounting cutting elements on said external surface.

34. The method of claim 29 wherein said method further comprises brazing cutting elements on said external surface after said shell is heated.

35. A method for making an earth boring drag-type drill bit comprising:
forming an outer shell of said bit around a ductile interior shell, said shell having an external surface adapted to carry drag-type cutting elements and said interior shell having an internal surface adapted for connection to a bit shank;
heating the shells;
engaging the bit shank with the internal surface of said interior shell; and
cooling the shells thereby causing the same to contract into further engagement with said shank.

36. The method of claim 35 wherein forming an outer shell of said bit comprises forming said outer shell in a mold.

37. The method of claim 36 wherein forming said outer shell in a mold comprises infiltrating a matrix powder in a mold.

38. The method of claim 37 wherein said further comprises
inserting an upper mold body into the mold; and
substantially filling the space between said mold and said upper mold body with matrix powder.

39. The method of claim 35 wherein heating the outer shell is performed in conjunction with mounting cutting elements on said external surface.

40. The method of claim 35 wherein heating the outer shell is performed with an induction heater.

41. The method of claim 40 wherein heating the outer shell comprises:
placing a first induction heater within said shell;
placing a second induction heater adjacent the interior of said shell; and
turning on said induction heaters.

42. The method of claim 41 wherein said method further comprises brazing cutting elements on said external surface after said shell is heated.

43. A method for making an earth boring drill bit comprising:
forming an outer shell of said bit by infiltrating matrix powder in a mold, said shell having an external surface adapted to carry cutting elements and an internal surface adapted for connection to a bit shank;
heating the outer shell, including the steps of:
placing a first induction heater within said shell;
placing a second induction heater adjacent the interior of said shell; and
turning on said induction heaters;
engaging the bit shank with the internal surface of said outer shell; and cooling the shell thereby causing the same to contract into further engagement with said shank.

44. The method of claim 43 wherein heating the outer shell is performed in conjunction with mounting cutting elements on said external surface.

45. The method of claim 22 wherein said method further comprises brazing cutting elements on said external surface after said shell is heated.

46. A method for making an earth boring drill bit comprising:
    infiltrating a matrix powder in a mold to form an outer shell of said bit, said shell having an external surface adapted to carry cutting elements and a bore for receiving a bit shank, including:
        inserting an upper mold body into the mold; and
        substantially filling the space between said mold and said upper mold body with matrix powder; and
    forming a plurality of radially extending ridges and grooves disposed between said shank and the radially inner surface of said bore, said ridges being received in said grooves when said shank is inserted in said bore;
    inserting the bit shank into said bore; and
    connecting the shank to said shell about the periphery of each.

47. The method of claim 29 wherein said method further includes casting a plurality of shells having differently shaped external surfaces and having substantially identically shaped internal surfaces.

48. The method of claim 29 wherein said method further includes casting a plurality of shells having differently sized external surfaces and having substantially identically shaped internal surfaces.

49. The method of claim 18 wherein connecting the mandrel to said shell about the periphery of each comprises connecting the mandrel directly to said shell.

50. The method of claim 1 wherein said method further includes attaching said outer shell to a ductile interior shell.

51. A method for making an earth boring drill bit comprising:
    forming an outer shell of said bit, said shell having an external surface adapted to carry cutting elements and an internal surface having a first annular shoulder, said internal surface being adapted for connection to a bit shank having a second annular shoulder;
    heating the outer shell;
    engaging the bit shank with the internal surface of said outer shell until said first and second annular shoulders are substantially opposite one another; and
    cooling the shell thereby causing the first and second shoulders to contract into engagement with one another.

52. The method of claim 51 wherein said internal surface and said shank each further include a plurality of annular shoulders and wherein said method further comprises:
    engaging the bit shank with the internal surface of said outer shell until the shoulders on said internal surface and the shoulders on said shank are substantially opposite one another; and
    cooling the shell thereby causing the shoulders on said internal surface and the shoulders on said shank to contract into engagement with one another.

53. A method for making an earth boring drill bit comprising:
    infiltrating a matrix powder in a mold by inserting an upper mold body into the mold and packing the space between said mold and said upper mold body with matrix powder to form an outer shell of said bit, said shell having an external surface adapted to carry cutting elements and a bore for receiving a bit mandrel;
    forming a plurality of radially extending ridges and grooves disposed between said shank and the radially inner surface of said bore, said ridges being received in said grooves when said shank is inserted in said bore;
    inserting the bit mandrel into said bore after infiltrating the matrix powder; and
    connecting the mandrel to said shell about the periphery of each.

54. The method of claim 53 wherein said method further includes casting a plurality of shells having differently shaped external surfaces and having substantially identically shaped internal surfaces.

55. The method of claim 53 wherein said method said method further includes casting a plurality of shells having differently sized external surfaces and having substantially identically shaped internal surfaces.

* * * * *